United States Patent
Ambrus et al.

(10) Patent No.: US 12,217,519 B2
(45) Date of Patent: Feb. 4, 2025

(54) SYSTEMS AND METHODS FOR UNCERTAINTY AWARE MONOCULAR 3D OBJECT DETECTION

(71) Applicants: TOYOTA RESEARCH INSTITUTE, INC.; THE BOARD OF TRUSTEES OF THE LELAND STANFORD JUNIOR UNIVERSITY, Stanford, CA (US)

(72) Inventors: Rares Andrei Ambrus, San Francisco, CA (US); Or Litany, Sunnyvale, CA (US); Vitor Guizilini, Santa Clara, CA (US); Leonidas Guibas, Palo Alto, CA (US); Adrien David Gaidon, Mountain View, CA (US); Jie Li, San Jose, CA (US)

(73) Assignees: TOYOTA RESEARCH INSTITUTE, INC., Los Altos, CA (US); THE BOARD OF TRUSTEES OF THE LELAND STANFORD JUNIOR UNIVERSITY, Stanford, CA (US)

(*) Notice: Subject to any disclaimer, the term of this patent is extended or adjusted under 35 U.S.C. 154(b) by 370 days.

(21) Appl. No.: 17/543,144

(22) Filed: Dec. 6, 2021

(65) Prior Publication Data

US 2023/0177850 A1    Jun. 8, 2023

(51) Int. Cl.
   *G06N 3/08*     (2023.01)
   *G06T 7/20*     (2017.01)
   (Continued)

(52) U.S. Cl.
   CPC ............... *G06V 20/64* (2022.01); *G06N 3/08* (2013.01); *G06T 7/20* (2013.01); *G06V 20/56* (2022.01); *G06T 2207/30241* (2013.01)

(58) Field of Classification Search
   None
   See application file for complete search history.

(56) References Cited

U.S. PATENT DOCUMENTS

2023/0219585 A1* 7/2023 Eiras ................... G05D 1/0214
                                                              701/25

OTHER PUBLICATIONS

Pek, Christian, et al. âCommonRoad Drivability Checker: Simplifying the Development and Validation of Motion Planning Algorithms.â 2020 IEEE Intelligent Vehicles Symposium (IV), 2020, pp. 1013â20. IEEE Xplore, https://doi.org/10.1109/IV47402.2020.9304544. (Year: 2020).*

(Continued)

*Primary Examiner* — Matthew C Bella
*Assistant Examiner* — Johnny B Duong
(74) *Attorney, Agent, or Firm* — SEYFARTH SHAW LLP

(57) ABSTRACT

A method for 3D object detection is described. The method includes predicting, using a trained monocular depth network, an estimated monocular input depth map of a monocular image of a video stream and an estimated depth uncertainty map associated with the estimated monocular input depth map. The method also includes feeding back a depth uncertainty regression loss associated with the estimated monocular input depth map during training of the trained monocular depth network to update the estimated monocular input depth map. The method further includes detecting 3D objects from a 3D point cloud computed from the estimated monocular input depth map based on seed positions selected from the 3D point cloud and the estimated depth uncertainty map. The method also includes selecting 3D bounding boxes of the 3D objects detected from the 3D point cloud based on the seed positions and an aggregated depth uncertainty.

20 Claims, 10 Drawing Sheets

(51) Int. Cl.
  *G06V 20/56* (2022.01)
  *G06V 20/64* (2022.01)

(56) References Cited

OTHER PUBLICATIONS

Cheng, Bowen, et al. Back-Tracing Representative Points for Voting-Based 3D Object Detection in Point Clouds. arXiv:2104.06114, arXiv, Apr. 14, 2021. arXiv.org, https://doi.org/10.48550/arXiv.2104.06114. (Year: 2021).*

Fu, Huan, et al. "Deep ordinal regression network for monocular depth estimation." Proceedings of the IEEE conference on computer vision and pattern recognition. 2018. (Year: 2018).*

Shao, Shuwei, et al. "Nenet: Monocular depth estimation via neural ensembles." arXiv preprint arXiv:2111.08313 (2021). (Year: 2021).*

Chen, Hansheng, et al. MonoRUn: Monocular 3D Object Detection by Reconstruction and Uncertainty Propagation. arXiv: 2103.12605, arXiv, Mar. 24, 2021. arXiv.org, https://doi.org/10.48550/arXiv.2103.12605. (Year: 2021).*

Wang, Yan, et al. "Pseudo-lidar from visual depth estimation: Bridging the gap in 3d object detection for autonomous driving." Proceedings of the IEEE/CVF conference on computer vision and pattern recognition. 2019. (Year: 2019).*

Zhang, Yunpeng, Jiwen Lu, and Jie Zhou. "Objects are different: Flexible monocular 3d object detection." Proceedings of the IEEE/CVF Conference on Computer Vision and Pattern Recognition. 2021. (Year: 2021).*

Guizilini, et al. "Robust Semi-Supervised Monocular Depth Estimation With Reprojected Distances." In Conference on Robot Learning, pp. 503-512. PMLR, 2020.

Qi, et al., "Deep hough voting for 3D object detection in point clouds." In Proceedings of the IEEE International Conference on Computer Vision, pp. 9277-9286. 2019.

Weng, et al., "Monocular 3d object detection with pseudo-lidar point cloud." In Proceedings of the IEEE International Conference on Computer Vision Workshops, 2019.

Qian, et al., "End-to-end Pseudo-LiDAR for image-based 3d object detection", In Proceedings of the IEEE/CVF Conference on Computer Vision and Pattern Recognition, 2020, pp. 5881-5890.

Lang, et al., "Pointpillars: Fast encoders for object detection from point clouds", In Proceedings of the IEEE Conference on Computer Vision and Pattern Recognition, 2019, pp. 12697-12705.

Vasiljevic, et al., "Neural ray surfaces for self-supervised learning of depth and ego-motion", arXiv:2008.06630, 2020.

Wang, et al., "Pseudo-lidar from visual depth estimation: Bridging the gap in 3d object detection for autonomous driving." In Proceedings of the IEEE Conference on Computer Vision and Pattern Recognition, pp. 8445-8453. 2019.

Qi, et al., "Pointnet++: Deep hierarchical feature learning on point sets in a metric space." In Advances in neural Information processing systems, pp. 5099-5108. 2017.

Wang, et al., "Dynamic graph cnn for learning on point clouds." Acm Transactions On Graphics (tog) 38, No. 5 (2019): 1-12.

Shi, et al., "Unsupervised Deep Shape Descriptor With Point Distribution Learning." In Proceedings of the IEEE/CVF Conference on Computer Vision and Pattern Recognition, pp. 9353-9362. 2020.

Yang, et al., "D3VO: Deep Depth, Deep Pose and Deep Uncertainty for Monocular Visual Odometry." In Proceedings of the IEEE/CVF Conference on Computer Vision and Pattern Recognition, pp. 1281-1292. 2020.

Cheng, et al., "Deep stereo using adaptive thin volume representation with uncertainty awareness." In Proceedings of the IEEE/CVF Conference on Computer Vision and Pattern Recognition, pp. 2524-2534. 2020.

Kendall, et al., "Multi-task learning using uncertainty to weigh losses for scene geometry and semantics." In Proceedings of the IEEE conference on computer vision and pattern recognition, pp. 7482-7491. 2018.

* cited by examiner

*FIG. 7A*  *FIG. 7B*  *FIG. 7C*
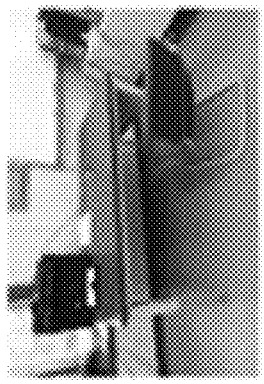 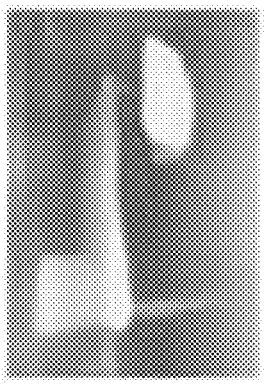 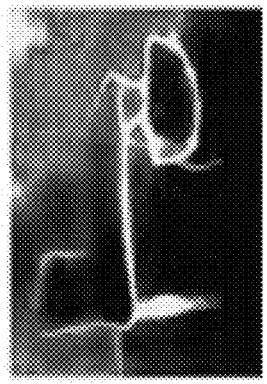
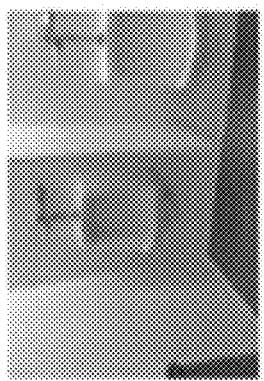 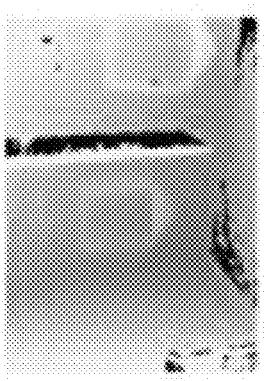 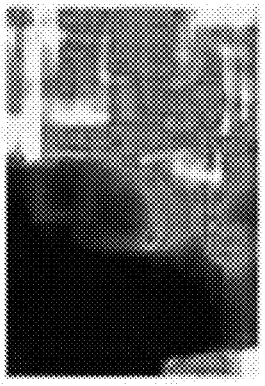
 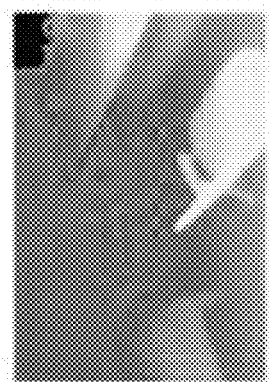 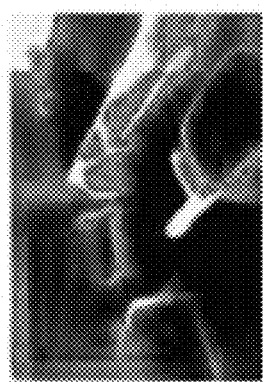
700 — Input RGB    730 — Output depth    740 — Output Uncertainty

SYSTEMS AND METHODS FOR UNCERTAINTY AWARE MONOCULAR 3D OBJECT DETECTION

BACKGROUND

Field

Certain aspects of the present disclosure generally relate to machine learning and, more particularly, a system and method for uncertainty aware 3D monocular object detection.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by one or more sensors, such as sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles may analyze sensor image data for detecting objects in the surrounding scene from the autonomous agent.

Autonomous agents, such as driverless cars and robots, are quickly evolving and have become a reality in this decade. The ability to reconstruct the structure of a scene with high-accuracy is fundamental to ensuring robust autonomous navigation. Additionally, detecting objects and accurately locating them in 3D space is a prerequisite for many robotic and autonomous driving tasks. Techniques for facilitating and improving the task of detecting objects in 3D space from monocular camera images are desired. Specifically, a method that bridges monocular 3D reconstruction and 3D object detection based on point cloud data for enabling uncertainty aware learning of 3D object detection directly from camera images is desired.

SUMMARY

A method for 3D object detection is described. The method includes predicting, using a trained monocular depth network, an estimated monocular input depth map of a monocular image of a video stream and an estimated depth uncertainty map associated with the estimated monocular input depth map. The method also includes feeding back a depth uncertainty regression loss associated with the estimated monocular input depth map during training of the trained monocular depth network to update the estimated monocular input depth map. The method further includes detecting 3D objects from a 3D point cloud computed from the estimated monocular input depth map based on seed positions selected from the 3D point cloud and the estimated depth uncertainty map. The method also includes selecting 3D bounding boxes of the 3D objects detected from the 3D point cloud based on the seed positions and an aggregated depth uncertainty.

A non-transitory computer-readable medium having program code recorded thereon for uncertainty aware 3D object detection is described. The program code is executed by a processor. The non-transitory computer-readable medium includes program code to predict, using a trained monocular depth network, an estimated monocular input depth map of a monocular image of a video stream and an estimated depth uncertainty map associated with the estimated monocular input depth map. The non-transitory computer-readable medium also includes program code to feedback a depth uncertainty regression loss associated with the estimated monocular input depth map during training of the trained monocular depth network to update the estimated monocular input depth map. The non-transitory computer-readable medium further includes program code to detect 3D objects from a 3D point cloud computed from the estimated monocular input depth map based on seed positions selected from the 3D point cloud and the estimated depth uncertainty map. The non-transitory computer-readable medium also includes program code to select 3D bounding boxes of the 3D objects detected from the 3D point cloud based on the seed positions and an aggregated depth uncertainty.

A system for uncertainty aware monocular 3D object detection is described. The system includes a trained monocular depth network to predict an estimated monocular input depth map of a monocular image of a video stream and an estimated depth uncertainty map associated with the estimated monocular input depth map. The system also includes a depth uncertainty regression module to feedback a depth uncertainty regression loss associated with the estimated monocular input depth map during training of the trained monocular depth network to update the estimated monocular input depth map. The system further includes a 3D object detection network to detect 3D objects from a 3D point cloud computed from the estimated monocular input depth map based on seed positions selected from the 3D point cloud and the estimated depth uncertainty map. The system also includes a 3D bounding box module to select 3D bounding boxes of the 3D objects detected from the 3D point cloud based on the seed positions and an aggregated depth uncertainty.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 7A-7C are diagrams illustrating predicting of an estimated depth map and generating of an estimated depth uncertainty map based on an input monocular image, according to aspects of the present disclosure.

DETAILED DESCRIPTION

Figure 1:
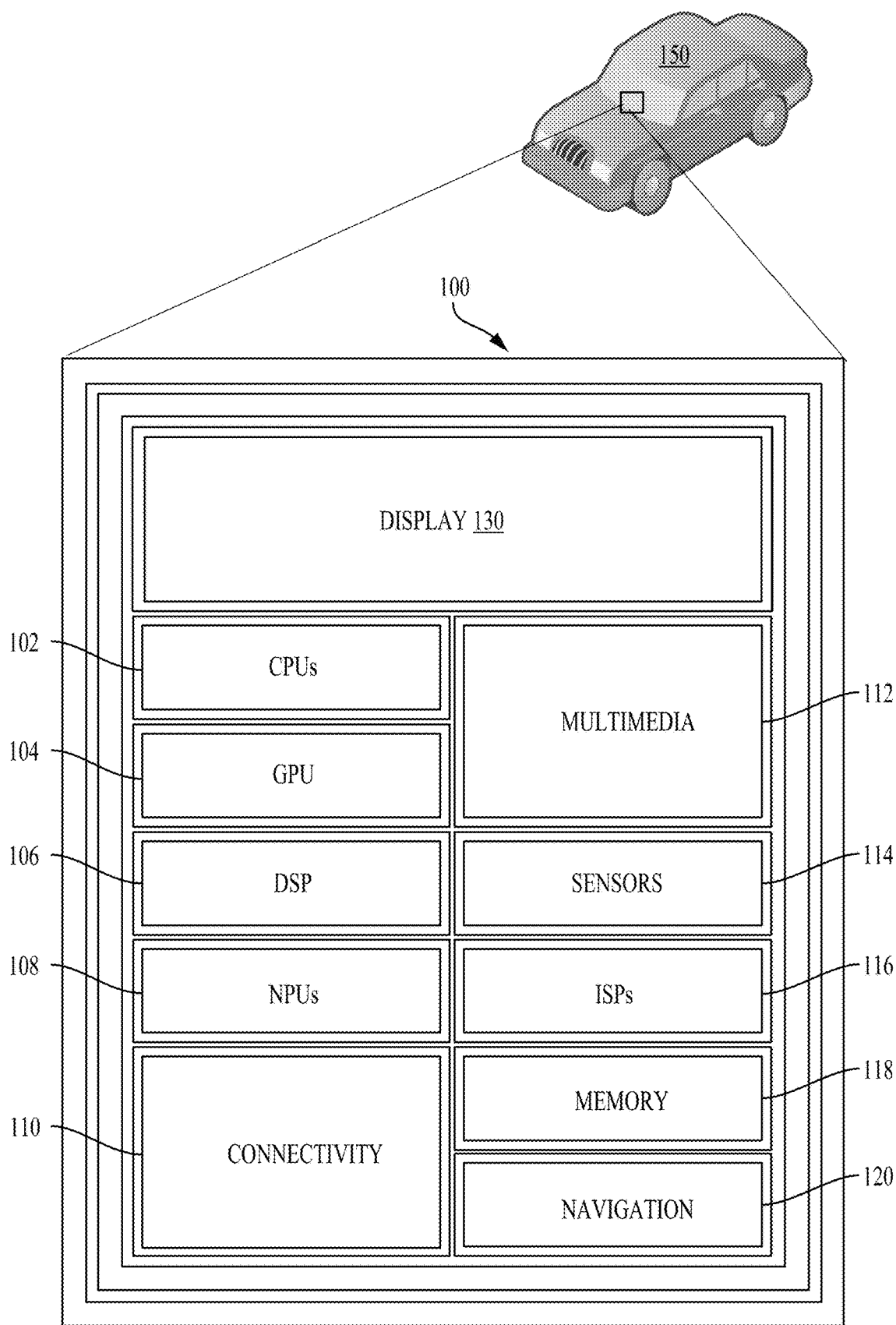
FIG. 1 illustrates an example implementation of designing a system using a system-on-a-chip (SOC) for uncertainty aware monocular 3D object detection, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, such as driverless cars and robots, are quickly evolving and have become a reality in this decade. The ability to reconstruct the structure of a scene with high-accuracy is fundamental to ensuring robust autonomous navigation. Additionally, detecting objects and accurately locating them in 3D space is a prerequisite for many robotic and autonomous driving tasks. Techniques for facilitating and improving the task of detecting objects in 3D space from monocular camera images are desired. Specifically, a method that incorporates an uncertainty output associated with a depth at each pixel into a downstream object detection network that incorporates this uncertainty when computing the pose of the objects in the scene is desired.

Traditional approaches to monocular 3D reconstruction rely on hand-engineered features to reliably reconstruct scenes from camera imagery. More recently, deep learning approaches have shown considerable promise in eliminating these hand-engineered features for further improving 3D reconstruction, and have especially helped in ill-posed regimes (e.g., reconstructing textureless regions, or geometrically under-determined regimes). A great number of learning-based depth and pose estimation algorithms have been proposed in recent years, both in self-supervised and supervised settings, such as state-of-the-art methods for monocular depth estimation. These conventional methods aim at detecting 3D objects using the monocular depth (sometimes referred to as "pseudo-lidar" based methods). While these methods show promising results, the uncertainty from the task of monocular depth estimation is not considered by the second task of object detection in the optimization process.

Aspects of the present disclosure are directed to a new method that is a key issue in the 3D monocular object detection setting. In particular, conventional 3D object detection methods are designed to work with relatively accurate depth sensors (e.g., LIDAR and/or RGB depth (RGB-D) cameras), with well understood noise characteristics and patterns. Nevertheless, a depth regressed by monocular depth estimation networks may exhibit significantly different statistics, leading to a gap in performance when directly applying methods designed to work with data of a different level of quality. To compensate for this deficiency, aspects of the present disclosure provide a modified depth prediction network to learn a per-pixel uncertainty value associated with the depth prediction. Subsequently, the depth prediction is combined with a 3D object detection framework that relies on a voting scheme that operates directly with the 3D points, which avoids any discretization operation. In these aspects of the present disclosure, a 3D object detection framework is modified to incorporate an uncertainty associated with a predicted monocular depth.

Some aspects of the present disclosure are directed to a two-part 3D object detection framework. The first portion of the 3D object detection framework involves a monocular depth prediction stage that regresses per-pixel uncertainty associated with each depth prediction. In a second 3D object detection stage, given the predicted depth with associated uncertainty, the 3D object detection stage leverages the predicted uncertainty and weighs the depth predictions accordingly.

FIG. 1 illustrates an example implementation of the aforementioned system and method for uncertainty aware monocular 3D object detection using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for uncertainty aware 3D object detection in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
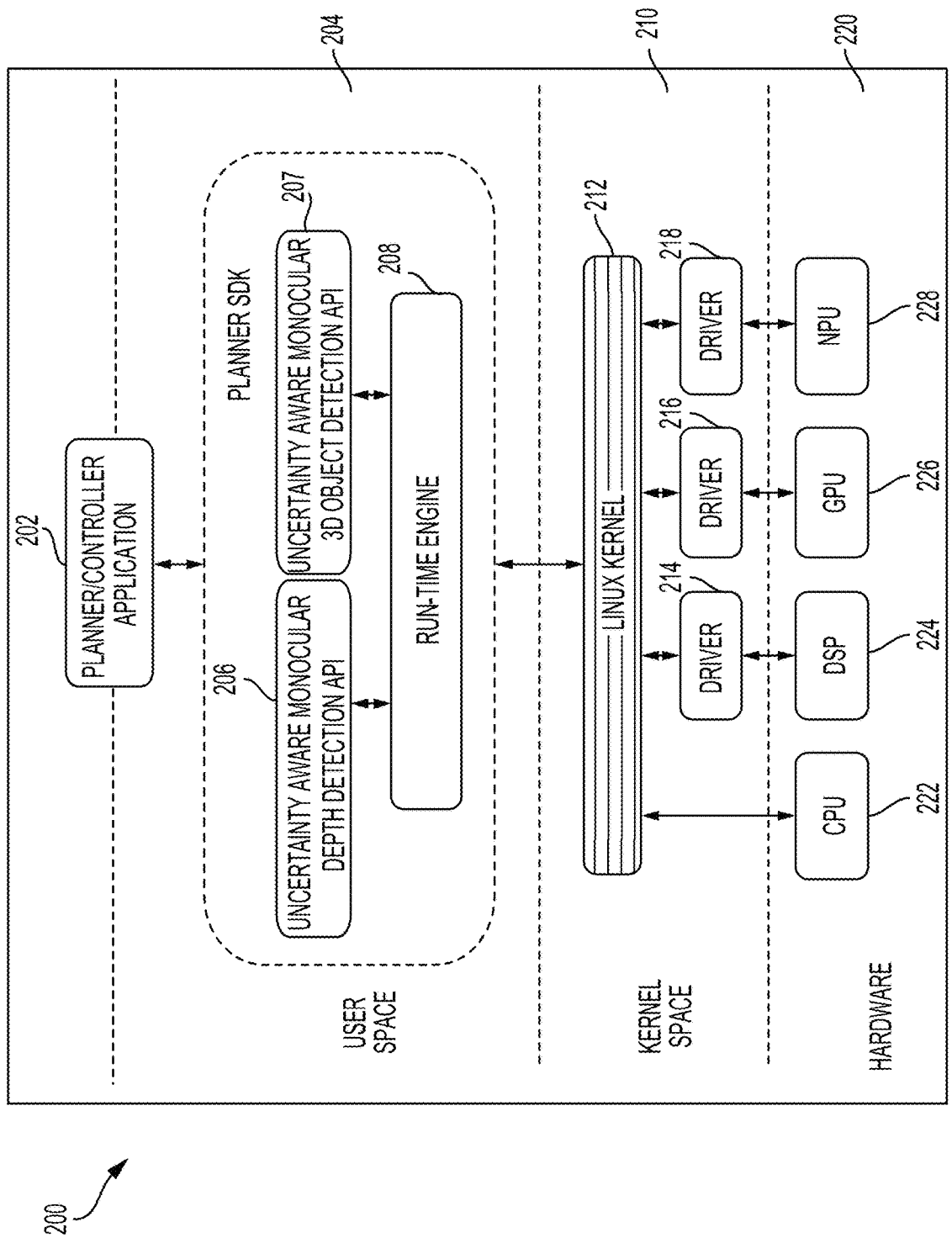
FIG. 2 is a block diagram illustrating a software architecture that may modularize functions for uncertainty aware monocular 3D object detection, according to aspects of the present disclosure.

FIG. 2 is a block diagram illustrating a software architecture 200 that may modularize functions for uncertainty aware monocular 3D object detection in frames of a video stream, according to aspects of the present disclosure. Using the architecture, a planner/controller application 202 may be designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for uncertainty aware monocular 3D object detection in frames of a video stream captured by a monocular camera of an ego vehicle. The planner/controller application 202 may make a request to compile program code associated with a library defined in an uncertainty aware monocular depth detection application programming interface (API) 206 for monocular depth detection. The planner/controller application 202 may make a request to compile program code associated with a library defined in an uncertainty aware monocular 3D object detection API 207 for the task of detecting 3D objects in monocular frames of a video stream captured by an autonomous agent.

A run-time engine 208, which may be compiled code of a runtime framework, may be further accessible to the planner/controller application 202. The planner/controller application 202 may cause the run-time engine 208, for example, to perform tracking of detecting semantic keypoints in subsequent frames of a monocular (single-camera) video stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
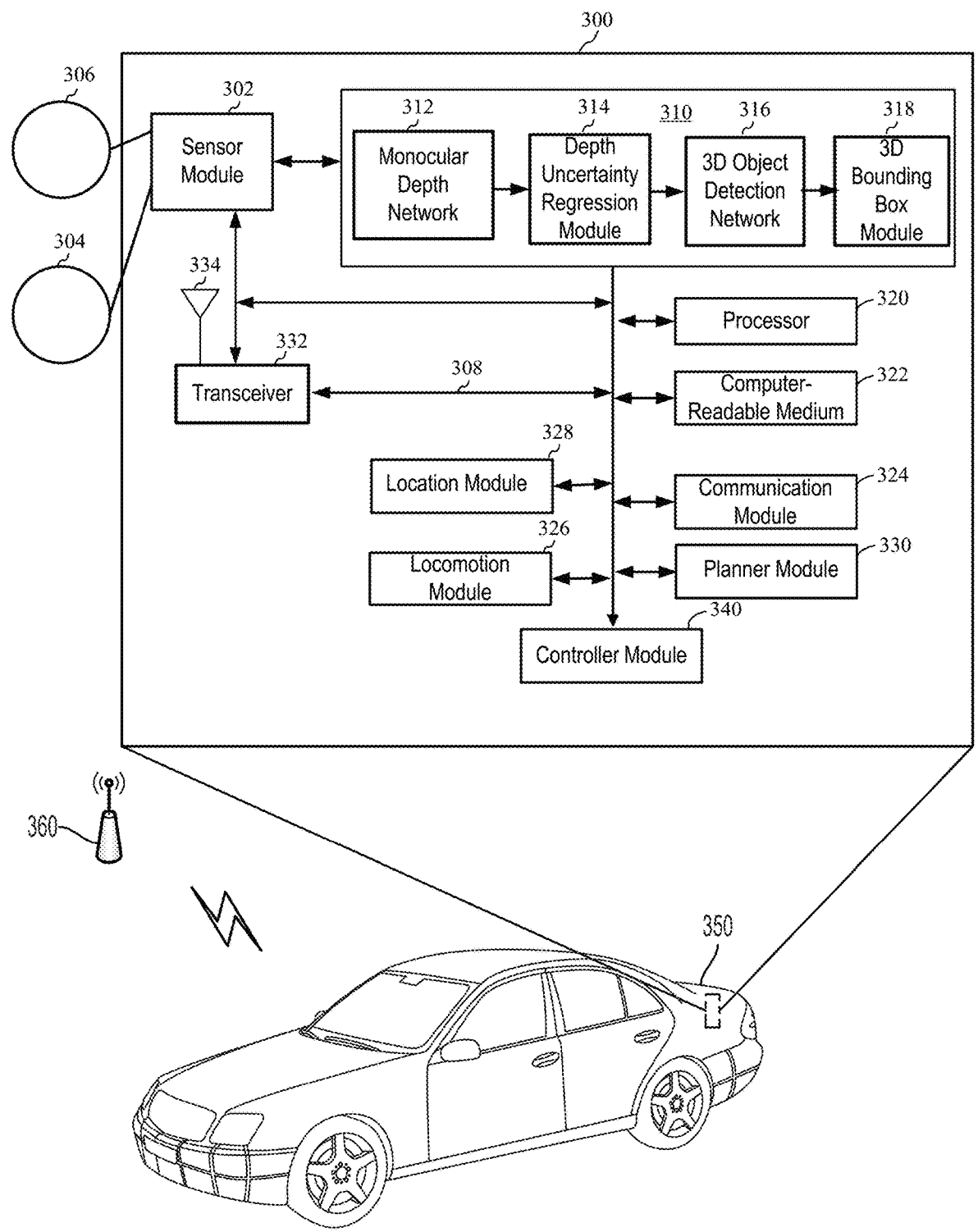
FIG. 3 is a diagram illustrating an example of a hardware implementation for an uncertainty aware monocular 3D object detection system, according to aspects of the present disclosure.

FIG. 3 is a diagram illustrating an example of a hardware implementation for an uncertainty aware monocular 3D object detection system 300, according to aspects of the present disclosure. The uncertainty aware monocular 3D object detection system 300 may be configured for planning and control of an ego vehicle in response to 3D object detection within frames of a monocular (single-camera) video stream captured during operation of a car 350.

The uncertainty aware monocular 3D object detection system 300 may be a component of a vehicle, a robotic device, or other device. For example, as shown in FIG. 3, the uncertainty aware monocular 3D object detection system 300 is a component of the car 350. Aspects of the present disclosure are not limited to the uncertainty aware monocular 3D object detection system 300 being a component of the car 350, as other devices, such as a bus, motorcycle, or other like vehicle, are also contemplated for using the uncertainty aware monocular 3D object detection system 300. The car 350 may be autonomous or semi-autonomous.

The uncertainty aware monocular 3D object detection system 300 may be implemented with an interconnected architecture, represented generally by an interconnect 308. The interconnect 308 may include any number of point-to-point interconnects, buses, and/or bridges depending on the specific application of the uncertainty aware monocular 3D object detection system 300 and the overall design constraints of the car 350. The interconnect 308 links together various circuits including one or more processors and/or hardware modules, represented by a sensor module 302, an ego perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The uncertainty aware monocular 3D object detection system 300 includes a transceiver 332 coupled to the sensor module 302, the ego perception module 310, the processor 320, the computer-readable medium 322, the communication module 324, the locomotion module 326, the location module 328, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The uncertainty aware monocular 3D object detection system 300 includes the processor 320 coupled to the computer-readable medium 322. The processor 320 performs processing, including the execution of software stored on the computer-readable medium 322 to provide keypoint tracking functionality, according to the present disclosure. The software, when executed by the processor 320, causes the uncertainty aware monocular 3D object detection system 300 to perform the various functions described for ego vehicle perception based on 3D object tracking between frame from video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 and the second sensor 306 may be a vision sensor (e.g., a stereoscopic camera or a red-green-blue (RGB) camera) for capturing 2D RGB images. The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication-Physical layer using microwave at 5.9 GHZ (review); EN 12795: 2002 Dedicated Short-Range Communication (DSRC)-DSRC Data link layer: Medium Access and Logical Link Control (review); EN 12834:2002 Dedicated Short-Range Communication-Application layer (review); EN 13372: 2004 Dedicated Short-Range Communication (DSRC)-DSRC profiles for RTTT applications (review); and EN ISO 14906:2004 Electronic Fec Collection-Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the uncertainty aware monocular 3D object detection system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VOLTE, or any other mobile data network or combination of mobile data networks. Further, the network access point 360 may include one or more IEEE 802.11 wireless networks.

The uncertainty aware monocular 3D object detection system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

The ability to reconstruct the structure of a scene with high-accuracy is fundamental to ensuring robust autonomous navigation of an ego vehicle, such as the car 350. Additionally, detecting objects and accurately locating them in 3D space is a prerequisite for many robotic and autonomous driving tasks of the car 350. Techniques for facilitating and improving the task of detecting objects in 3D space from monocular camera images are desired. Specifically, a method that incorporates an uncertainty output associated with a depth at each pixel into a downstream object detection network that incorporates this uncertainty when computing the pose of the objects in a scene directly from camera images captured by the car 350 is desired.

As shown in FIG. 3, the ego perception module 310 includes a monocular depth network 312, a depth uncertainty regression module 314, a 3D object detection network 316, and a 3D bounding box module 318. The monocular depth network 312, the depth uncertainty regression module 314, the 3D object detection network 316, and the 3D bounding box module 318 may be components of a same or different artificial neural network. The monocular depth network 312 and the 3D object detection network 316 may be implemented using a convolutional neural network, such as a deep convolutional neural network. The ego perception module 310 receives a data stream from the first sensor 304 and/or the second sensor 306. The data stream may include a 2D RGB image from the first sensor 304 and/or the second sensor 306. The data stream may include multiple frames, such as image frames. In this configuration, the first sensor 304 captures monocular (single camera) 2D RGB images from which a monocular depth map is predicted by the monocular depth network 312 using the depth uncertainty regression module 314.

The ego perception module 310 is configured to leverage uncertainty from a predicted monocular depth map for enabling uncertainty aware monocular 3D object detection from the monocular RGB images received from the first sensor 304 or the second sensor 306. The 3D object detection network 316 detects 3D objects directly from a 3D point cloud computed from the estimated monocular depth map by leveraging pixel-level uncertainty from the estimated monocular input depth map. According to aspects of the present disclosure, the monocular depth network 312 predicts an estimated monocular input depth map through depth uncertainty regression loss using an estimated depth uncertainty map from the depth uncertainty regression module 314.

In aspects of the present disclosure, the 3D object detection network 316 is trained to detect 3D objects from a 3D point cloud computed from the estimated monocular input depth map based on seed positions selected from the 3D point cloud and an aggregated depth uncertainty based on the estimated depth uncertainty map. As described, a 3D point cloud is a set of data points in space. Each point is represented by a set of X, Y, and Z coordinates and associated learn features, and the points of the point cloud may represent a 3D object. The 3D bounding box module 318 selects 3D bounding boxes of the 3D objects detected from the 3D point cloud based on the seed positions and the aggregated depth uncertainty. In aspects of the present disclosure, the aggregated depth uncertainty is provided as input to the 3D object detection network 316. In a conventional system, uncertainty in the monocular depth network 312 is not provided as an input to the 3D object detection network 316. By contrast, aspects of the present disclosure leverage an uncertainty from the monocular depth network 312 to update the 3D object detection network 316 and the 3D bounding box module 318.

In some aspects of the present disclosure, the monocular depth network 312 predicts the estimated monocular input depth map (e.g., monodepth) from which a 3D point cloud is computed by the 3D object detection network 316. According to aspects of the present disclosure, the ego perception module 310 provides a novel learning component that links the uncertainty of the predicted depth map with a bounding box selection scheme of the 3D bounding box module 318.

Aspects of the present disclosure modify the monocular depth network 312 to learn a per-pixel uncertainty value associated with the depth prediction using the depth uncertainty regression module 314. Subsequently, the depth prediction is combined with the 3D object detection network 316 for the 3D bounding box module 318. The 3D object detection network 316 is configured according to a voting scheme that operates directly with the 3D points, which avoids any discretization operation. In these aspects of the present disclosure, the 3D object detection network 316 is modified to incorporate an uncertainty associated with the estimated monocular input depth using the depth uncertainty regression module 314.

Some aspects of the present disclosure are directed to a two-part configuration of the uncertainty aware monocular 3D object detection system 300. The first portion of the uncertainty aware monocular 3D object detection system 300 involves the monocular depth network 312 and the depth uncertainty regression module 314 that regresses per-pixel uncertainty associated with each depth prediction. In a second 3D object detection stage, given the predicted depth with associated uncertainty, the 3D object detection network 316 leverages the predicted uncertainty and weighs the depth predictions accordingly.

In some aspects of the present disclosure, the 3D object detection network 316 is configured using a voting scheme for selecting the final 3D bounding boxes using the 3D bounding box module 318. According to this aspect of the present disclosure, a ground truth displacement between a vote and the ground truth object position is computed online given the estimated monocular input depth map and the 3D objects detected from the 3D point cloud by the 3D object detection network 316. In this example, the 3D bounding box module 318 selects the predicted final 3D bounding boxes from the 3D objects detected by the 3D object detection network 316 using a voting scheme (e.g., Hough voting) to enable autonomous vehicle operation, as shown in FIG. 4.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

Figure 4:
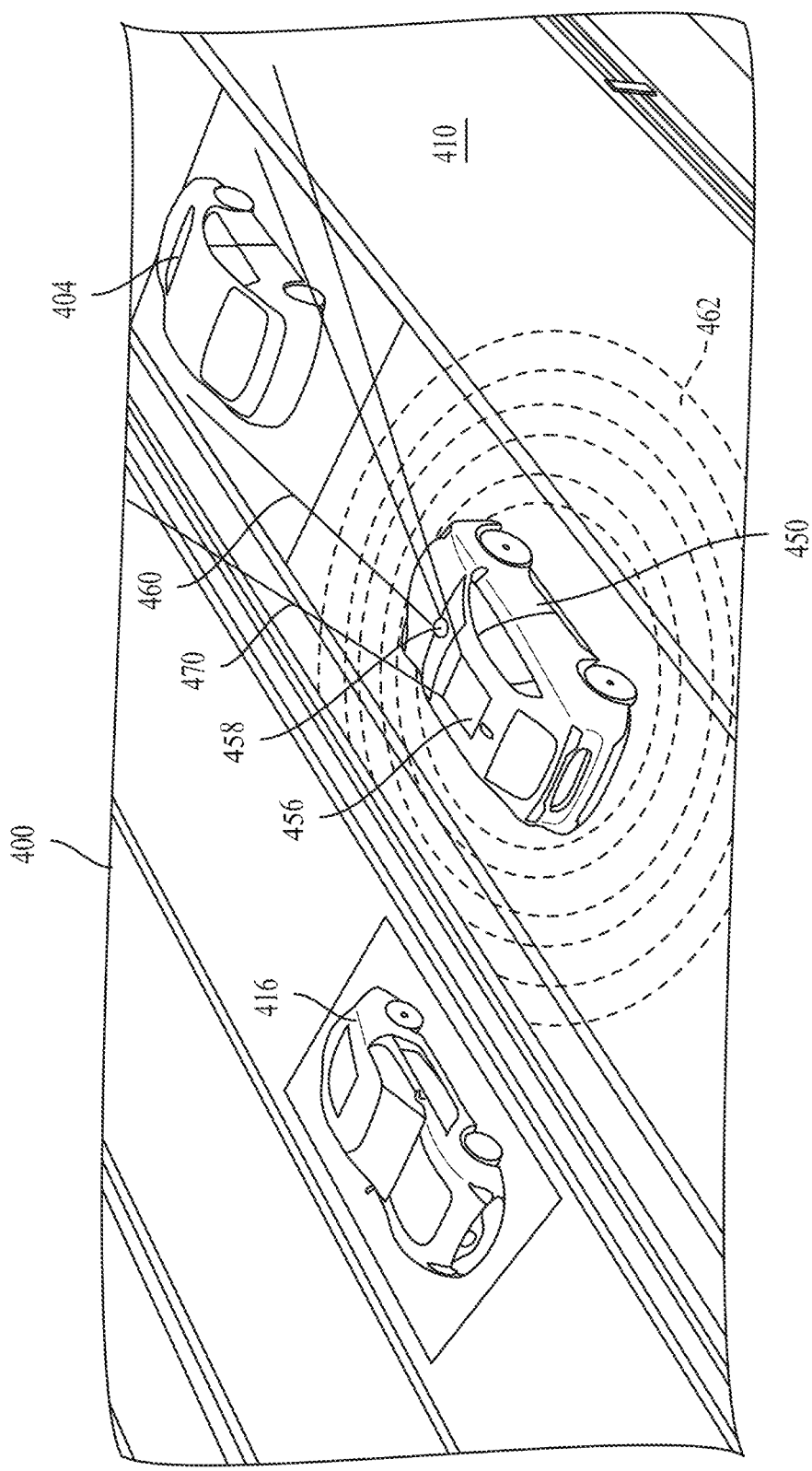
FIG. 4 is a drawing illustrating an example of an ego vehicle in an environment, according to aspects of the present disclosure.

FIG. 4 illustrates an example of an ego vehicle 450 (e.g., the car 350) in an environment 400 according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 458, such as a 2D RGB camera, and a second sensor 456. The second sensor 456 may be another RGB camera or another type of sensor, such as ultrasound, and/or RADAR, light detection and ranging (LIDAR), as shown by reference number 462. Additionally, or alternatively, the ego vehicle 450 may include one or more additional sensors. For example, the additional sensors may be side facing and/or rear facing sensors.

In one configuration, the 2D camera 458 captures a 2D image that includes objects in the 2D camera's 458 field of view 460. The second sensor 456 may generate one or more output streams. The 2D image captured by the 2D camera includes a 2D image of the first vehicle 404, as the first vehicle 404 is in the 2D camera's 458 field of view 460. A field of view 470 of the second sensor 456 is also shown.

The information obtained from the second sensor 456 and the 2D camera 458 may be used to navigate the ego vehicle 450 along a route when the ego vehicle 450 is in an autonomous mode. The second sensor 456 and the 2D camera 458 may be powered from electricity provided from the ego vehicle's 450 battery (not shown). The battery may also power the ego vehicle's 450 motor. The information obtained from the second sensor 456 and the 2D camera 458 may be used to generate a 3D representation of an environment.

Light detection and ranging (LIDAR) sensors are the sensor of choice for most self-driving car developers because they provide reliable and accurate range data at large distances. In addition, LIDAR sensors are used for a wide variety of applications within the self-driving car ecosystem (e.g., mapping, localization, object detection, and last but not least, safety critical evasive maneuvers. As shown in FIG. 4, the second sensor 456 may be implemented using either a Velodyne or Luminar LIDAR sensor to build a 3D spatial representation of the local world around the ego vehicle 450. While these sensors have shown strong performance, especially in high-dynamic range regimes, they are generally limiting due to the sparse nature of the 3D reconstructions produced. Furthermore, the cost of using LIDAR sensors currently pose an economic challenge for global scale deployments.

A number of manufacturers are looking at replacing LIDAR sensors with cameras, such as the 2D camera 458 for self-driving cars, such as the ego vehicle 450. In particular, the 2D camera 458 can provide both a dense semantic and spatial understanding of a scene by reasoning across space (e.g., stereo, multi-camera) and time (e.g., multi-view reconstruction). Aspects of the present disclosure are directed to a self-supervised mechanism for image-based depth estimation by bootstrapping geometric constraints inherent in robots, or via sparse depth labels from calibrated LIDAR sensors. In particular, aspects of the present disclosure modify the monocular depth network 312 to learn a per-pixel uncertainty value associated with the depth prediction using the depth uncertainty regression module 314. In these aspects of the present disclosure, the 3D object detection network 316 incorporates the uncertainty associated with the predicted monocular depth output for object detection and 3D bounding box selection by the 3D bounding box module 318 shown in FIG. 3.

Aspects of the present disclosure improve upon self-supervised depth and ego-motion learning by incorporating uncertainty aware 3D object detection from monocular images. These aspects of the present disclosure enable a 3D object detection network designed to operate with "ground truth" depth data (e.g., LIDAR or RGB-D) to leverage uncertainty associated with the depth generated by monocular depth prediction networks. In these aspects of the present disclosure, the depth prediction is combined with a 3D object detection framework that relies on a voting scheme that operates directly with the 3D points, which avoids any discretization operation. In these aspects of the present disclosure, a 3D object detection framework is modified to incorporate an uncertainty associated with a predicted monocular depth.

Aspects of the present disclosure bypasses common point discretization steps and operates directly with the raw depth predicted from monocular images. Longer term benefits of the present disclosure include reconstruction and understanding of scenes from monocular depth prediction and ego-motion estimation. The ability to bootstrap and learn from other calibrated LIDAR or stereo camera sensors eventually benefits fusion stages for 3D spatial reconstruction (either from single/multi-view monocular imagery, or from both LIDAR and monocular imagery combined). The potential long-term implications for an accurate single-image depth estimation model are considerable.

Some aspects of the present disclosure are directed to a two-part 3D object detection framework. The first portion of the 3D object detection framework involves a monocular depth prediction stage that regresses per-pixel uncertainty associated with each depth prediction. In a second 3D object detection stage, given the predicted depth with associated uncertainty, the 3D object detection stage leverages the predicted uncertainty and weighs the depth predictions accordingly.

Figure 5:
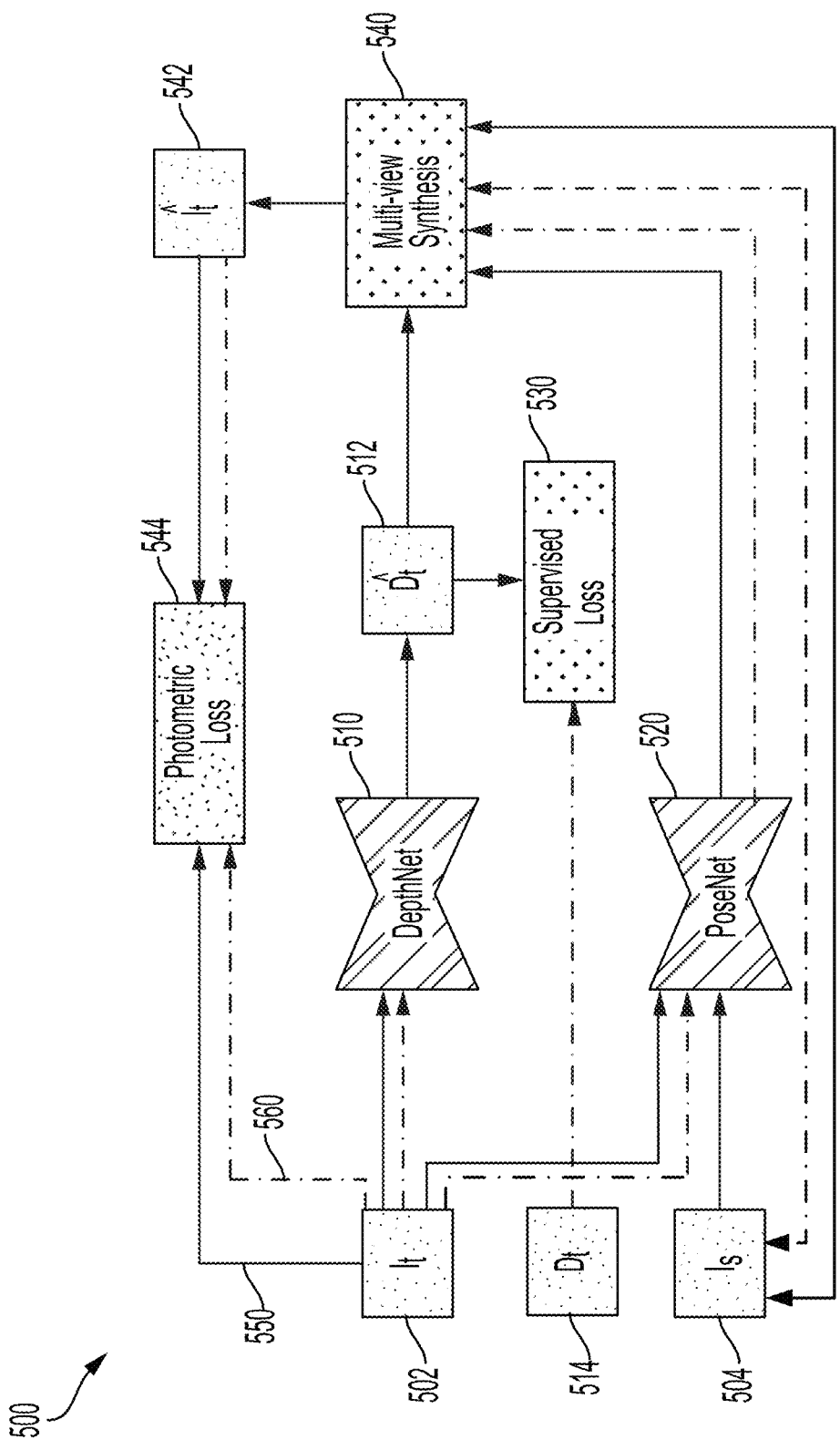
FIG. 5 is a block diagram illustrating an uncertainty aware monocular 3D object detection system between monocular images of a video stream, according to aspects of the present disclosure.

FIG. 5 is a block diagram illustrating a semi-supervised, monocular depth estimation framework 500 for uncertainty aware 3D object detection, according to aspects of the present disclosure. In one aspect of the present disclosure, the monocular depth estimation framework 500 is used to implement the monocular depth network 312 of the ego perception module 310 shown in FIG. 3 using, for example, a semi-supervised configuration.

In one configuration, the monocular depth estimation framework 500 receives two consecutive images, a target image ($I_t$) 502 and a source image ($I_s$) 504 of a monocular video. In this configuration, the target image $I_t$ 502 is provided as input to a depth network (DepthNet 510), which outputs a monocular depth prediction map 512 (e.g., $D_t^*$). In addition, the context image $I_c$ 504 is provided as input to a pose network (PoseNet 520). The DepthNet 510 may be implemented using an encoder followed by a decoder to provide the monocular depth prediction map 512. In this example, the monocular depth prediction map 512 and a ground truth depth map 514 ($D_t$) are provided to a supervised loss block 530.

In aspects of the present disclosure, two consecutive images (e.g., the target image $I_t$ 502 and the source image $I_s$ 504) are used as input to self-supervise monocular depth learning of the monocular depth estimation framework 500. In this configuration, the DepthNet 510 and the PoseNet 520 are simultaneously trained in an end-to-end process using a combination of a photometric loss block 544 and a multi-view synthesis block 540. The monocular depth estimation framework 500 provides monocular depth map estimation for 3D object detection using a synthesized target image $I_t^*$ 542. In addition, the monocular depth estimation framework 500 is semi-supervised, including self-supervised training paths 550 and semi-supervised reinforcement paths 560 to enable 3D object detection.

Figure 6:
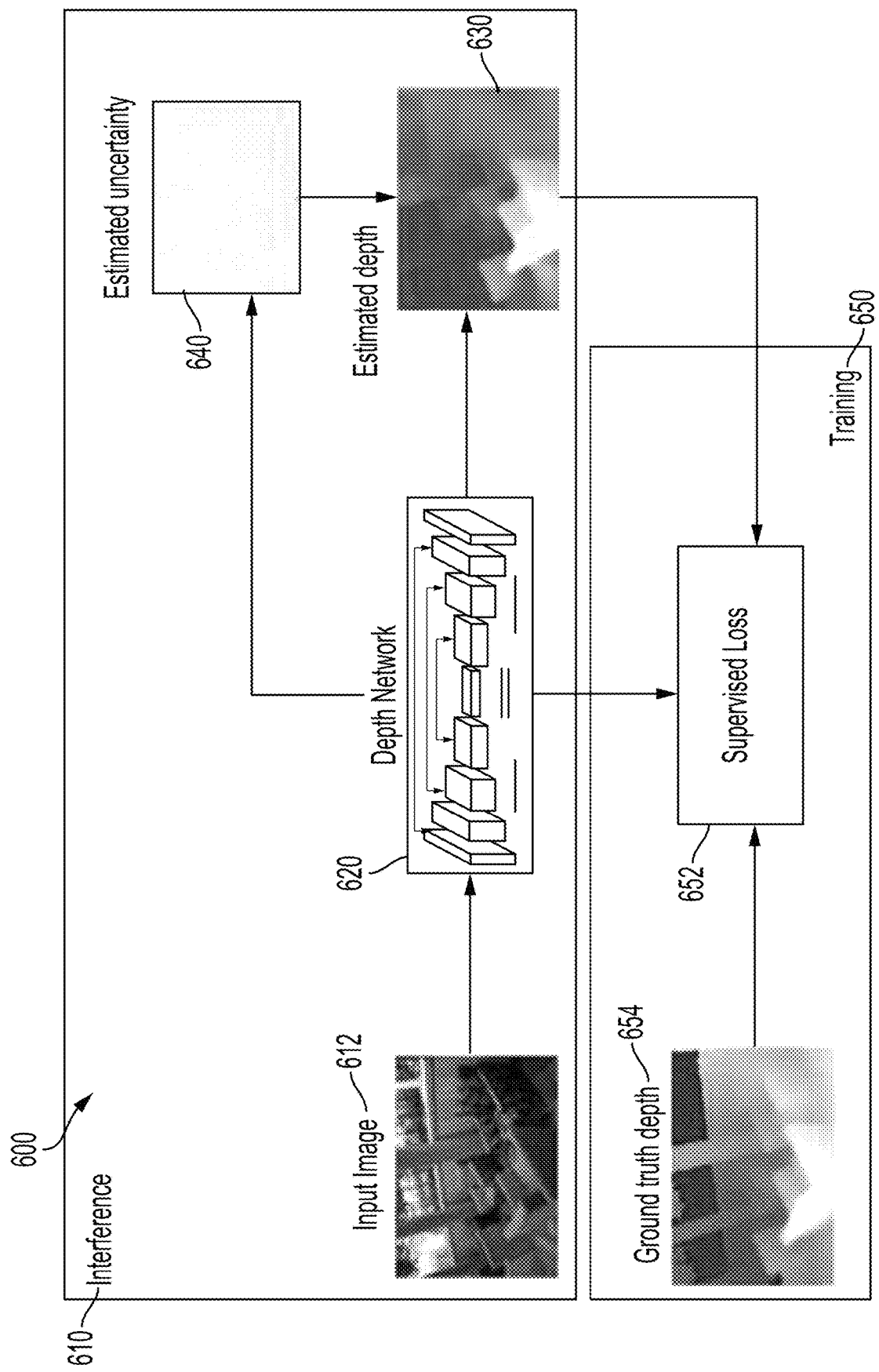
FIG. 6 is a block diagram of a monocular depth prediction pipeline configured to regress a per-pixel uncertainty to quantify errors in monocular depth prediction, according to aspects of the present disclosure.

FIG. 6 is a block diagram of a monocular depth prediction pipeline configured to regress a per-pixel uncertainty to quantify errors in monocular depth prediction, according to aspects of the present disclosure. In one configuration, a monocular depth prediction network pipeline 600 includes an inference stage 610 and a training stage 650. The inference stage 610 is composed of a monocular depth prediction network 620 (e.g., monodepth). In this configuration, the monocular depth prediction network 620 is shown receiving an input image 612 of a monocular video stream. In response to the input image 612, the monocular depth prediction network 620 predicts an estimated monocular input depth map 630 of the input image 612 of the monocular video stream.

In this aspect of the present disclosure, the monocular depth prediction network 620 also generates an estimated depth uncertainty 640 associated with the estimated monocular input depth map 630. In this example, the estimated depth uncertainty 640 may represent a variance in the estimated monocular depth at each pixel location of the input image 612. For example, the estimated depth uncertainty 640 for the input image 612 may denote uncertainty around the boundaries of an object in the input image 612, for example, as shown in FIGS. 7A-7C.

FIGS. 7A-7C are diagrams illustrating predicting of an estimated depth map and generating of an estimated depth uncertainty map based on an input monocular image, according to aspects of the present disclosure. As shown in the estimated depth uncertainty map of FIG. 7C, an output uncertainty 740 represents a variance in an output depth 730 of FIG. 7B at each pixel of an input red-green-blue (RGB) image 700 of FIG. 7A. In particular, the output uncertainty 740 shown in FIG. 7C denotes the output uncertainty 740 around the boundaries of objects of the input RGB image 700. As shown in FIG. 7C, the output uncertainty 740 when predicting the output depth 730 is shown using difference shading schemes. In this example, darker shades denote areas with higher confidence, while brighter shades denote areas with higher uncertainty.

Referring again to FIG. 6, during the training stage 650 of the monocular depth prediction network 620, a supervised loss function 652 optimizes the monocular depth prediction network 620 based on a ground truth estimated depth map 654 to refine the estimated monocular input depth map 630. Furthermore, the supervised loss function 652 is modified to account for the estimated depth uncertainty 640. The modifications to the monocular depth prediction network pipeline 600 enable regression of the per-pixel uncertainty. In aspects of the present disclosure, the estimated monocular input depth map 630 and the estimated depth uncertainty 640 are provided as outputs of the monocular depth prediction network pipeline 600 to a monocular 3D object detection aggregation layer framework, for example, as shown in FIG. 8.

Figure 8:
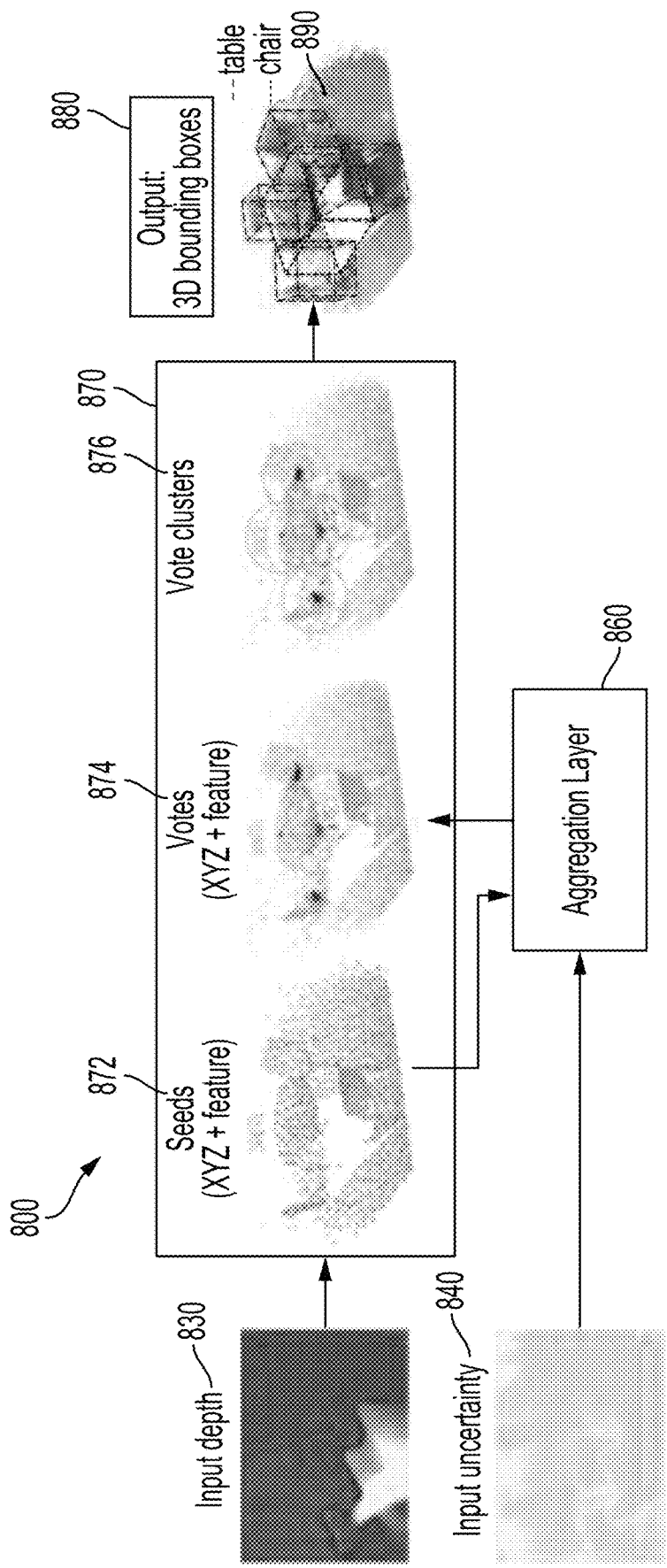
FIG. 8 is a block diagram illustrating an uncertainty aggregation layer of a monocular 3D object detection framework, according to aspects of the present disclosure.

FIG. 8 is a block diagram illustrating an uncertainty aggregation layer of a monocular 3D object detection aggregation layer framework 800, according to aspects of the present disclosure. In one configuration, the monocular 3D object detection aggregation layer framework 800 includes an aggregation layer 860 and a 3D object detection network 870. In this configuration, the aggregation layer 860 receives an input depth uncertainty 840, and the 3D object detection network 870 receives an estimated monocular input depth map 830, each of which may be predicted as shown in FIG. 6. These aspects of the present disclosure are directed to the aggregation layer 860 that incorporates a variance estimate of the noise in each depth measurement according to the input depth uncertainty 840.

In this configuration, the 3D object detection network 870 is given the estimated monocular input depth map 830 as input. In this example, the 3D object detection network 870 computes a 3D point cloud from the estimated monocular input depth map 830 by multiplying the estimated monocular input depth map 830 by camera intrinsic parameters. In some aspects of the present disclosure, the 3D object detection network 870 selects a set of seed points 872 from the computed 3D point cloud, in which each seed point predicts votes (e.g., predicted votes 874). The predicted votes 874 are then aggregated into vote clusters 876. A 3D bounding box selection module 880 processes the vote clusters 876 and 3D bounding boxes are regressed to generate the 3D bounding boxes 890. In these aspects of the present disclosure, the aggregation layer 860 refines the predicted votes 874 by leveraging the input depth uncertainty 840.

Various possible implementations of the aggregation layer 860 to parameterize an uncertainty layer into the 3D object detection network 870 are contemplated. For example, one implementation of the aggregation layer 860 may be parameterized by (i) a sequence of multi-layer-perceptions (MLPs), which facilitate learning on unordered point sets with a distance measure. Another implementation of the aggregation layer 860 may be a dynamic graph (DG) convolutional neural network (CNN) that maintains a permutation invariance of point sets; however, the aggregation layer 860 may be designed to capture a local geometric structure by encoding features in edges between points. A further implementation of the aggregation layer 860 is provided by computing, analytically, a union of the distributions defined by depth points with associated variances.

Figure 9:
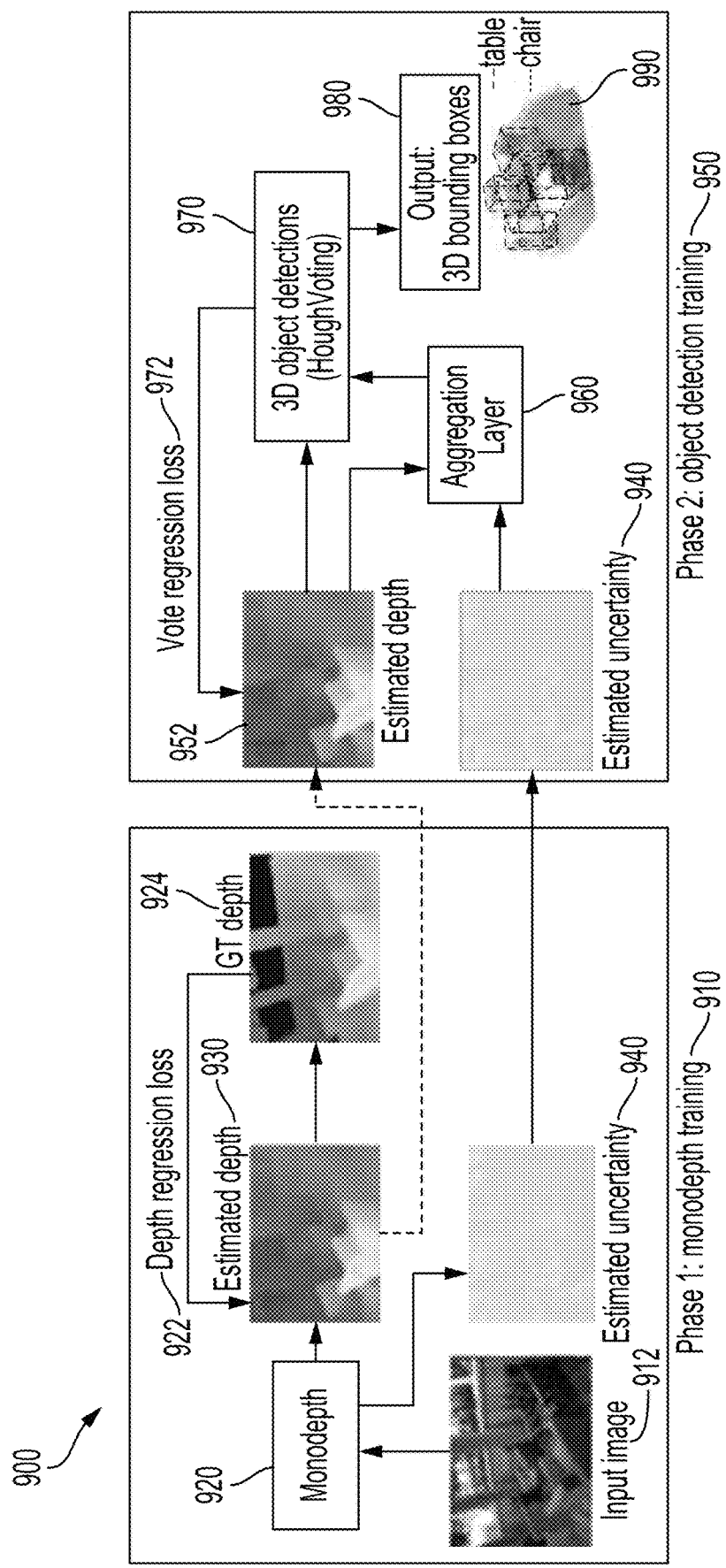
FIG. 9 is a block diagram of an uncertainty aware monocular 3D object detection architecture using concurrently trained monocular depth prediction and 3D object detection networks, according to aspects of the present disclosure.

FIG. 9 is a block diagram of an uncertainty aware monocular 3D object detection framework 900 configured to quantify errors in monocular depth prediction using input depth uncertainty to improve monocular 3D object detection, according to aspects of the present disclosure. In one aspect of the present disclosure, the uncertainty aware monocular 3D object detection framework 900 is used to implement the ego perception module 310 shown in FIG. 3 using, for example, uncertainty from a monocular depth prediction to improve a 3D object detection network.

Aspects of the present disclosure improve upon self-supervised depth and ego-motion learning by incorporating uncertainty aware 3D object detection from monocular images. These aspects of the present disclosure enable a 3D object detection network 970 designed to operate with "ground truth" depth data (e.g., LIDAR or RGB-D) from a ground truth depth map 924 to leverage uncertainty associated with an estimated monocular input depth map 930 generated by a monocular depth prediction network 920. In these aspects of the present disclosure, the depth prediction of the estimated monocular input depth map 930 is combined with the 3D object detection network 970 that relies on a voting scheme that operates directly on the 3D points, which avoids any discretization operation. In this example, a 3D point cloud is computed from the estimated monocular input depth map 930. In these aspects of the present disclosure, the 3D object detection network 970 is modified to incorporate an estimated uncertainty map 940 associated with a predicted monocular depth of the estimated monocular input depth map 930.

In one configuration, the uncertainty aware monocular 3D object detection framework 900 is composed of the monocular depth prediction network 920 (e.g., monodepth). In this configuration, the uncertainty aware monocular 3D object detection framework 900 includes a monocular depth prediction network 920, which is shown receiving an input image 912 of a monocular video stream. In response to the input image 912, the monocular depth prediction network 920 predicts the estimated monocular input depth map 930 of the input image 912 of the monocular video stream. During training of the monocular depth prediction network 920, the monocular depth prediction network 920 is optimized based on the ground truth depth map 924 and a depth regression loss 922 to refine the estimated monocular input depth map 930.

These aspects of the present disclosure are directed to a two-part configuration of the uncertainty aware monocular 3D object detection framework 900. The first portion of the uncertainty aware monocular 3D object detection framework 900 involves the monocular depth prediction stage 910 that regresses per-pixel uncertainty associated with each depth prediction by generating the estimated uncertainty map 940. A second portion of the uncertainty aware monocular 3D object detection framework 900 involves a 3D object detection stage 950, which receives as input, the estimated monocular input depth map 930 and the associated uncertainty captured by the estimated uncertainty map 940. In this configuration, the 3D object detection stage 950 leverages the predicted uncertainty from the estimated uncertainty map 940 and weighs the estimated monocular input depth map 930 for performing 3D object detection.

According to aspects of the present disclosure, the estimated monocular input depth map 930 is provided to the 3D object detection network 970 and the estimated uncertainty map 940 is provided to an aggregation layer 960 of the 3D object detection stage 950. In this example, the 3D object detection network 970 computes a 3D point cloud from the estimated monocular input depth map 930 by multiplying the estimated monocular input depth map 930 by camera intrinsic parameters. For example, in FIG. 8 the 3D point cloud is shown as the seed points 872, the predicted votes 874, and the vote clusters 876.

In some aspects of the present disclosure, the 3D object detection network 870 is trained to select seeds and predict votes according to the 3D point cloud computed from the estimated monocular input depth map 830, for example, as shown in FIG. 8. In addition, a 3D bounding box selection module 980 selects 3D bounding boxes 990 from the computed 3D point cloud (e.g., the seed points 872, the predicted votes 874, and the vote clusters 876 of FIG. 8) based on a selection regression loss 972, such as a voting regression loss using Hough Voting to finalize selection of the 3D bounding boxes 990. In these aspects of the present disclosure, the aggregation layer 960 refines the predicted votes 874 (see FIG. 8) of the 3D object detection network 970 by leveraging the input of the estimated uncertainty map 940 to provide an aggregated depth uncertainty 952.

One aspect of the present disclosure combines monocular depth prediction and an associated depth uncertainty with differentiable Hough Voting for 3D object detection using the 3D bounding box selection module 980. For example, the 3D point cloud computed from the estimated monocular input depth map 930 is represented by a set of selected seed points, in which each seed point predicts a vote. The votes are then aggregated and 3D bounding boxes are regressed to generate the 3D bounding boxes 990 based on the aggregated depth uncertainty 962. This configuration for 3D object detection avoids use of an RGB depth (RGB-D) sensor for monocular 3D reconstruction. Instead, aspects of the present disclosure leverage monocular depth prediction and associated depth uncertainty with 3D object bounding box selection directly from an RGB input of the input image 912. This aspect of the present disclosure relies on the estimated uncertainty map 940, which is derived from the monocular depth prediction network 920 for the task of 3D object detection. An uncertainty aware 3D object detection process is further described in FIG. 10.

Figure 10:
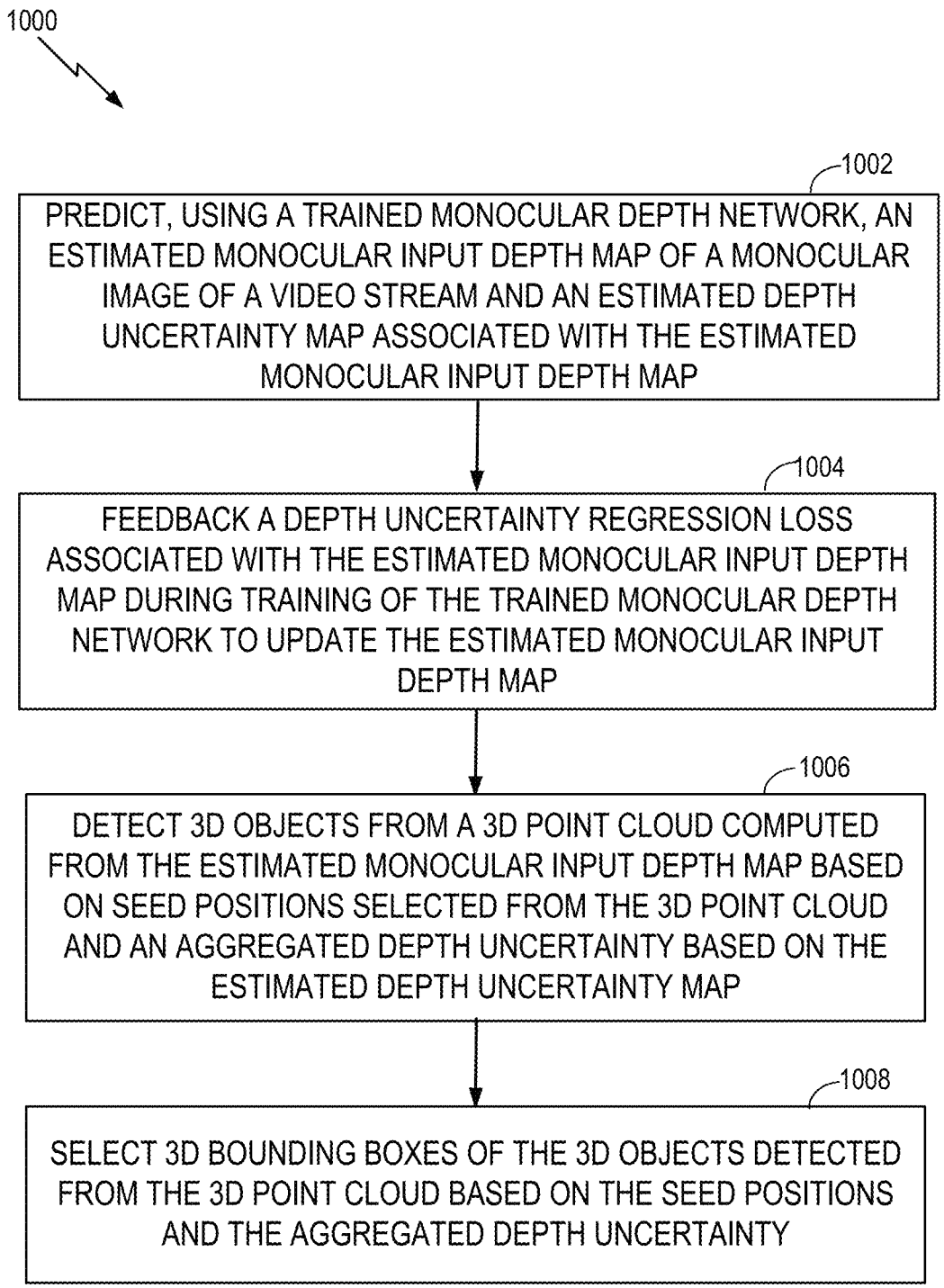
FIG. 10 is a flowchart illustrating a method for uncertainty aware monocular 3D object detection, according to aspects of the present disclosure.

FIG. 10 is a flowchart illustrating a method for uncertainty aware 3D object detection, according to aspects of the present disclosure. The method 1000 begins at block 1002, in which an estimated monocular input depth map of a monocular image of a video stream is predicted using a trained monocular depth network and an estimated depth uncertainty map associated with the estimated monocular input depth map. For example, as shown in FIG. 3, the ego perception module 310 receives a data stream from the first sensor 304 and/or the second sensor 306. In this configuration, the first sensor 304 captures monocular (single camera) 2D RGB images from which an estimated monocular depth map is predicted by the monocular depth network 312 using the depth uncertainty regression module 314. As shown in FIG. 6, the monocular depth prediction network 620 predicts an estimated monocular input depth map 630 of the input image 612 of the monocular video stream.

At block 1004, a depth uncertainty regression loss associated with the estimated monocular input depth map is feedback during training of the trained monocular depth network. For example, as shown in FIG. 9, in response to the input image 912, the monocular depth prediction network 920 predicts an estimated monocular input depth map 930 of the input image 912 of the monocular video stream. During training of the monocular depth prediction network 920, the monocular depth prediction network 920 is optimized based on a ground truth depth map 924 and a depth regression loss 922 to refine the estimated monocular input depth map 930.

At block 1006, 3D objects are detected from a 3D point cloud computed from the estimated monocular input depth map based on seed points selected from the 3D point cloud and an aggregated depth uncertainty based on the estimated depth uncertainty map. For example, as shown in FIG. 3, the 3D object detection network 316 is trained to detected 3D objects from a 3D point cloud computed from the estimated monocular input depth map based on seed points selected from the 3D point cloud and an aggregated depth uncertainty based on the estimated depth uncertainty map. As described, a 3D point cloud is a set of data points in space. Each point is represented by a set of X, Y, and Z coordinates (and other learned features), and the points of the point cloud may represent a 3D object.

At block 1008, 3D bounding boxes are selected for the 3D objects detected from the 3D point cloud based on the seed positions and the aggregated depth uncertainty. For example, as shown in FIG. 3, the 3D object detection network 316 is configured using a voting scheme for selecting the final 3D bounding boxes by the 3D bounding box module 318. According to this aspect of the present disclosure, a ground truth displacement between predicted votes and a ground truth 3D bounding box center of the 3D object is computed online given the estimated monocular input depth map and 3D objects detected from the 3D point cloud by the 3D object detection network 316. In this example, the 3D bounding box module 318 selects the predicted final 3D bounding boxes based on a voting scheme (e.g., Hough voting) of the 3D object detection network 316 to enable autonomous vehicle operation, as shown in FIG. 4.

The method 1000 also includes planning a trajectory of an ego vehicle according to the tracking of the inferred object. The method 1000 further includes selecting the seed positions from the 3D point cloud. The method 1000 also includes generating predicted votes of the 3D bounding boxes from the selected seed positions. The method 1000 further includes computing displacements between the predicted votes of the 3D bounding boxes and ground truth 3D bounding box positions obtained from the estimated monocular input depth map. The method 1000 also includes aggregating the seed positions selected from the 3D point cloud according to the estimated depth uncertainty map to provide the aggregated depth uncertainty. The method 1000 also includes detecting the 3D object by converting a scene depth of the estimated monocular input depth map of the monocular image into the 3D point cloud. The method 1000 further includes generating predicted votes of the 3D bounding boxes from the selected seed positions. The method 1000 also includes refining the predicted votes of the 3D bounding boxes by leveraging the estimated depth uncertainty map.

Aspects of the present disclosure are directed to a new method that is a key issue in the 3D monocular object detection setting. In particular, conventional 3D object detection methods are designed to work with relatively accurate depth sensors (e.g., LIDAR and/or RGB depth (RGB-D) cameras), with well understood noise characteristics and patterns. Nevertheless, a depth regressed by monocular depth estimation networks may exhibit significantly different statistics, leading to a gap in performance when directly applying methods designed to work with data of a different level of quality. To compensate for this deficiency, aspects of the present disclosure provide a modified depth prediction network to learn a per-pixel uncertainty value associated with the depth prediction. Subsequently, the depth prediction is combined with a 3D object detection framework that relies on a voting scheme that operates directly with the 3D points, which avoids any discretization operation. In these aspects of the present disclosure, a 3D object detection framework is modified to incorporate an uncertainty associated with a predicted monocular depth.

In some aspects of the present disclosure, the method 1000 may be performed by the SOC 100 (FIG. 1) or the software architecture 200 (FIG. 2) of the ego vehicle 150 (FIG. 1). That is, each of the elements of method 1000 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for uncertainty aware 3D object detection, comprising:
    predicting, using a trained monocular depth network, an estimated monocular input depth map of a monocular image of a video stream and an estimated depth uncertainty map associated with the estimated monocular input depth map;
    feeding back a depth uncertainty regression loss associated with the estimated monocular input depth map and a ground truth depth map during training of the trained monocular depth network to update the estimated monocular input depth map to form an output monocular depth map;
    updating the output monocular depth map using a vote regression loss from a 3D object detection network based on an aggregated depth uncertainty map corresponding to the estimated depth uncertainty map and the output monocular depth map;
    detecting, by the 3D object detection network, 3D objects from a 3D point cloud computed from the updated output monocular depth map based on seed positions selected from the 3D point cloud and the aggregated depth uncertainty map; and
    selecting, by the 3D object detection network, 3D bounding boxes of the 3D objects detected from the 3D point cloud based on the seed positions and refined, predicted votes based on the aggregated depth uncertainty map.

2. The method of claim 1, in which detecting the 3D objects comprises aggregating the seed positions selected from the 3D point cloud according to the estimated depth uncertainty map to provide the aggregated depth uncertainty.

3. The method of claim 2, in which aggregating comprises:
    generating predicted votes of the 3D bounding boxes from the selected seed positions; and
    refining the predicted votes of the 3D bounding boxes by leveraging the estimated depth uncertainty map.

4. The method of claim 1, in which detecting the 3D objects comprises converting a scene depth of the estimated monocular input depth map of the monocular image into the 3D point cloud.

5. The method of claim 1, in which selecting the 3D bounding boxes comprises:
    determining a set of seed points from the seed positions selected from the 3D point cloud, in which the set of seed points is associated with predicted votes of the 3D bounding boxes;
    aggregating the predicted votes from the set of seed points into vote clusters; and
    processing the vote clusters and regressing the 3D bounding boxes associated with the vote clusters.

6. The method of claim 1, in which predicting the estimated monocular input depth map comprises learning a per-pixel uncertainty value associated with each depth prediction of a scene in the monocular image to form the estimated depth uncertainty map.

7. The method of claim 1, in which detecting the 3D objects comprises:
selecting the seed positions from the 3D point cloud;
generating predicted votes of the 3D bounding boxes from the selected seed positions; and
computing displacements between the predicted votes of the 3D bounding boxes and ground truth 3D bounding box positions obtained from the estimated monocular input depth map.

8. The method of claim 1, further comprising:
planning a trajectory of an ego vehicle according to the 3D bounding boxes; and
operating the ego vehicle along the trajectory planned according to the 3D bounding boxes.

9. A non-transitory computer-readable medium having program code recorded thereon for uncertainty aware 3D object detection, the program code being executed by a processor and comprising:
program code to predict, using a trained monocular depth network, an estimated monocular input depth map of a monocular image of a video stream and an estimated depth uncertainty map associated with the estimated monocular input depth map;
program code to feedback a depth uncertainty regression loss associated with the estimated monocular input depth map and a ground truth depth map during training of the trained monocular depth network to update the estimated monocular input depth map to form an output monocular depth map;
program code to update the output monocular depth map using a vote regression loss from a 3D object detection network based on an aggregated depth uncertainty map corresponding to the estimated depth uncertainty map and the output monocular depth map;
program code to detect, by the 3D object detection network, 3D objects from a 3D point cloud computed from the updated output monocular depth map based on seed positions selected from the 3D point cloud and the aggregated depth uncertainty map; and
program code to select, by the 3D object detection network, 3D bounding boxes of the 3D objects detected from the 3D point cloud based on the seed positions and refined, predicted votes based on the aggregated depth uncertainty map.

10. The non-transitory computer-readable medium of claim 9, in which the program code to detect the 3D objects comprises program code to aggregate the seed positions selected from the 3D point cloud according to the estimated depth uncertainty map to provide the aggregated depth uncertainty.

11. The non-transitory computer-readable medium of claim 10, in which program code to aggregate comprises:
program code to generate predicted votes of the 3D bounding boxes from the selected seed positions; and
program code to refine the predicted votes of the 3D bounding boxes by leveraging the estimated depth uncertainty map.

12. The non-transitory computer-readable medium of claim 9, in which the program code to detect the 3D objects comprises program code to convert a scene depth of the estimated monocular input depth map of the monocular image into the 3D point cloud.

13. The non-transitory computer-readable medium of claim 9, in which the program code to select the 3D bounding boxes comprises:
program code to determine a set of seed points from the seed positions selected from the 3D point cloud, in which the set of seed points is associated with predicted votes of the 3D bounding boxes;
program code to aggregate the predicted votes from the set of seed points into vote clusters; and
program code to process the vote clusters and regressing the 3D bounding boxes associated with the vote clusters.

14. The non-transitory computer-readable medium of claim 9, in which the program code to predict the estimated monocular input depth map comprises program code to learn a per-pixel uncertainty value associated with each depth prediction of a scene in the monocular image to form the estimated depth uncertainty map.

15. The non-transitory computer-readable medium of claim 9, in which the program code to detect the 3D objects comprises:
program code to select the seed positions from the 3D point cloud;
program code to generate predicted votes of the 3D bounding boxes from the selected seed positions; and
program code to compute displacements between the predicted votes of the 3D bounding boxes and ground truth 3D bounding box positions obtained from the estimated monocular input depth map.

16. The non-transitory computer-readable medium of claim 9, further comprising:
program code to plan a trajectory of an ego vehicle according to the 3D bounding boxes; and
program code to operate the ego vehicle along the trajectory planned according to the 3D bounding boxes.

17. A system for uncertainty aware 3D object detection, the system comprising:
a trained monocular depth network to predict an estimated monocular input depth map of a monocular image of a video stream and an estimated depth uncertainty map associated with the estimated monocular input depth map;
a depth uncertainty regression module to feedback a depth uncertainty regression loss associated with the estimated monocular input depth map and a ground truth depth map during training of the trained monocular depth network to update the estimated monocular input depth map to form an output monocular depth map and to update the output monocular depth map using a vote regression loss from a 3D object detection network based on an aggregated depth uncertainty map corresponding to the estimated depth uncertainty map and the output monocular depth map;
a 3D object detection network to detect 3D objects from a 3D point cloud computed from the updated output monocular depth map based on seed positions selected from the 3D point cloud and the aggregated depth uncertainty map; and
a 3D bounding box module to select 3D bounding boxes of the 3D objects detected from the 3D point cloud based on the seed positions and refined, predicted votes based on the aggregated depth uncertainty map.

18. The system of claim 17, in which the 3D object detection network is further to aggregate the seed positions selected from the 3D point cloud according to the estimated depth uncertainty map to provide the aggregated depth uncertainty.

19. The system of claim 18, in which the 3D object detection network is further to generate predicted votes of the 3D bounding boxes from the selected seed positions, and to refine the predicted votes of the 3D bounding boxes by leveraging the estimated depth uncertainty map.

20. The system of claim 17, further comprising:
a planner to plan a trajectory of an ego vehicle according to the 3D bounding boxes; and
a controller to operate the ego vehicle along the trajectory planned according to the 3D bounding boxes.

* * * * *